United States Patent
Suzuki et al.

(10) Patent No.: US 10,703,138 B2
(45) Date of Patent: Jul. 7, 2020

(54) RUBBER COMPOSITION FOR TREAD AND TIRE

(71) Applicant: SUMITOMO RUBBER INDUSTRIES, LTD., Kobe-shi, Hyogo (JP)

(72) Inventors: Yumi Suzuki, Kobe (JP); Takeo Nakazono, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 50 days.

(21) Appl. No.: 15/896,511

(22) Filed: Feb. 14, 2018

(65) Prior Publication Data

US 2018/0229554 A1 Aug. 16, 2018

(30) Foreign Application Priority Data

Feb. 15, 2017 (JP) .................. 2017-025933

(51) Int. Cl.
| | | |
|---|---|---|
| C08L 9/06 | (2006.01) | |
| B60C 1/00 | (2006.01) | |
| C08K 3/04 | (2006.01) | |
| C08K 3/36 | (2006.01) | |
| C08K 5/1535 | (2006.01) | |
| C08K 3/22 | (2006.01) | |
| C08L 25/00 | (2006.01) | |
| C08L 9/00 | (2006.01) | |
| C08L 45/02 | (2006.01) | |
| C08K 5/00 | (2006.01) | |
| C08K 5/11 | (2006.01) | |

(52) U.S. Cl.
CPC .............. *B60C 1/0016* (2013.01); *C08K 3/04* (2013.01); *C08K 3/22* (2013.01); *C08K 3/36* (2013.01); *C08K 5/0016* (2013.01); *C08K 5/1535* (2013.01); *C08L 9/00* (2013.01); *C08L 9/06* (2013.01); *C08L 25/00* (2013.01); *C08L 45/02* (2013.01); *C08K 5/11* (2013.01); *C08K 2003/2227* (2013.01)

(58) Field of Classification Search
CPC .. C08L 25/00; C08L 9/00; C08L 95/02; C08L 9/06; C08K 3/22; C08K 3/36; C08K 5/11; C08K 5/1535; C08K 3/04; C08K 2003/2227; B60C 1/0016
See application file for complete search history.

(56) References Cited

U.S. PATENT DOCUMENTS

| | | | |
|---|---|---|---|
| 6,699,937 B1 * | 3/2004 | Scholl et al. ......... | B60C 1/0016 525/210 |
| 2007/0111834 A1 * | 5/2007 | Matsuda et al. .......... | F16G 1/28 474/202 |
| 2012/0132346 A1 * | 5/2012 | Chen et al. ........... | B60C 1/0016 156/110.1 |
| 2016/0068666 A1 * | 3/2016 | Nagase ..................... | C08L 9/06 524/430 |
| 2016/0222197 A1 * | 8/2016 | Peters et al. .......... | B60C 1/0016 |
| 2017/0121490 A1 | 5/2017 | Miyazaki | |

FOREIGN PATENT DOCUMENTS

| | | | | |
|---|---|---|---|---|
| JP | 5214170 | * | 5/1993 | ............... C08L 9/06 |
| JP | 2014-9250 A | | 1/2014 | |
| JP | 2015-34219 A | | 2/2015 | |
| JP | 2016-56235 A | | 4/2016 | |
| JP | 2016-56236 A | | 4/2016 | |
| WO | WO 2015/174229 A1 | | 11/2015 | |

* cited by examiner

*Primary Examiner* — Nathan M Nutter
(74) *Attorney, Agent, or Firm* — Birch, Stewart, Kolasch & Birch, LLP

(57) ABSTRACT

The rubber composition for a tread comprises: 5 to 30 parts by mass of a carbon black, 95 parts by mass or more of silica, 25 parts by mass or more of a powder of an inorganic compound represented by a given formula (A) and having an average primary particle size of 10 μm or less, and 70 parts by mass or more of a softening agent comprising 2 to 15 parts by mass of a coumarone-based resin, based on 100 parts by mass of a rubber component comprising 70% by mass or more of a styrene-butadiene rubber having a styrene content of from 20 to 50% by mass and a vinyl content of from 15 to 65%, and the tire has a tread composed of the rubber composition for a tread.

13 Claims, No Drawings

RUBBER COMPOSITION FOR TREAD AND TIRE

TECHNICAL FIELD

The present invention relates to a rubber composition for a tread and a tire having a tread composed of the rubber composition for a tread.

BACKGROUND OF THE INVENTION

There is a method of increasing a glass transition temperature (Tg) by adding a resin as one means for improving wet grip performance of a rubber composition. However, there is a problem that an initial grip is lowered. Further, increase in a silica content, increase in a filler content relative to plasticizer and addition of aluminum hydroxide are known as other means for improving wet grip performance. However, in the case of these means, there is a problem that abrasion resistance is decreased.

JP 2014-009250 A describes a rubber composition which can improve breaking resistance such as abrasion resistance and wet grip performance by allowing the rubber composition to comprise predetermined amounts of a diene rubber component comprising at least a styrene-butadiene rubber, a powder of a specific inorganic compound and an unsaturated carboxylate. However there is still a room for improvement.

SUMMARY OF THE INVENTION

An object of the present invention is to provide a rubber composition for a tread being excellent in abrasion resistance and wet grip performance, and a tire having a tread composed of the rubber composition for a tread.

The present invention relates to a rubber composition for a tread comprising: 5 to 30 parts by mass of a carbon black, 95 parts by mass or more of silica, 25 parts by mass or more of a powder of an inorganic compound represented by the following formula (A) and having an average primary particle size of 10 μm or less, and 70 parts by mass or more of a softening agent comprising 2 to 15 parts by mass of a coumarone-based resin, based on 100 parts by mass of a rubber component comprising 70% by mass or more of a styrene-butadiene rubber having a styrene content of from 20 to 50% by mass and a vinyl content of from 15 to 65%,

$$M \cdot \alpha SiO_2 \cdot \beta H_2O \quad (A)$$

(In the formula, M is an oxide or hydroxide of at least one metal selected from Al, Mg, Ti and Ca, and each of α and β is an integer of from 0 to 10.)

It is preferable that the softening agent comprises 11 to 20 parts by mass of bis(2-ethylhexyl)sebacate.

It is preferable that the powder of an inorganic compound is made of aluminum oxide and/or aluminum hydroxide.

The present invention also relates to a tire having a tread composed of the above-mentioned rubber composition for a tread.

The rubber composition for a tread according to one embodiment of the present disclosure comprising: 5 to 30 parts by mass of a carbon black, 95 parts by mass or more of silica, 25 parts by mass or more of a powder of an inorganic compound represented by the formula (A) and having an average primary particle size of 10 μm or less, and 70 parts by mass or more of a softening agent comprising 2 to 15 parts by mass of a coumarone-based resin, based on 100 parts by mass of a rubber component comprising 70% by mass or more of a styrene-butadiene rubber having a styrene content of from 20 to 50% by mass and a vinyl content of from 15 to 65%, and the tire according to one embodiment of the present disclosure having a tread composed of the above-mentioned rubber composition for a tread are excellent in abrasion resistance and wet grip performance.

Further the rubber composition for a tread comprising the softening agent comprising 11 to 20 parts by mass of bis(2-ethylhexyl)sebacate, and the tire having a tread composed of the rubber composition for a tread are more excellent in abrasion resistance.

DETAILED DESCRIPTION

The rubber composition for a tread according to one embodiment of the present disclosure is featured by comprising: 5 to 30 parts by mass of a carbon black, 95 parts by mass or more of silica, 25 parts by mass or more of a powder of an inorganic compound represented by the following formula (A) and having an average primary particle size of 10 μm or less, and 70 parts by mass or more of a softening agent comprising 2 to 15 parts by mass of a coumarone-based resin, based on 100 parts by mass of a rubber component comprising 70% by mass or more of a styrene-butadiene rubber having a styrene content of from 20 to 50% by mass and a vinyl content of from 15 to 65%,

$$M \cdot \alpha SiO_2 \cdot \beta H_2O \quad (A)$$

(In the formula, M is an oxide or hydroxide of at least one metal selected from Al, Mg, Ti and Ca, and each of α and β is an integer of from 0 to 10.)

It can be considered that, in the rubber composition for a tread according to this embodiment comprising a powder of an inorganic compound and a coumarone-based resin based on a rubber component comprising a specific styrene-butadiene rubber (SBR), the coumarone-based resin is present close to the powder of an inorganic compound, thereby inhibiting abrasion resistance from being deteriorated.

Further in another embodiment, in which the softening agent comprises bis(2-ethylhexyl)sebacate, since the softening agent comprises bis(2-ethylhexyl)sebacate being highly compatible with the SBR and the coumarone-based resin and exhibiting a high plasticating effect, uniformity of the rubber composition is improved and abrasion resistance is further enhanced.

The rubber component comprises the SBR having predetermined styrene content and vinyl content. The SBR is not limited particularly, and it includes a solution-polymerized SBR (S-SBR), an emulsion-polymerized SBR (E-SBR), and modified SBRs thereof (modified S-SBR, modified E-SBR) and the like. Examples of the modified SBRs include terminal- and/or main chain-modified SBRs, modified SBRs subjected to coupling with tin, a silicon compound or the like (a condensate, one having a branched structure and the like), hydrogenated SBRs (hydrogenated S-SBR, hydrogenated E-SBR) and the like. Among these, S-SBR is preferable.

A styrene content of the SBR is not less than 20% by mass, preferably not less than 25% by mass. When the styrene content is less than 20% by mass, a sufficient grip performance tends not to be obtained. On the other hand, the styrene content is not more than 50% by mass, preferably not more than 40% by mass. When the styrene content exceeds 50% by mass, there is a tendency that not only abrasion resistance decreases but also temperature dependency is increased, thereby causing a large change in performance against a temperature change and therefore, a stable wet grip performance during running cannot be obtained satisfactorily. Herein the styrene content of the SBR is a value calculated by $^1$H-NMR measurement.

A vinyl content of the SBR is not less than 15%, preferably not less than 20%. When the vinyl content is less than 15%, a sufficient wet grip performance tends not to be obtained. On the other hand, the vinyl content is not more than 65%, preferably not more than 63%. When the vinyl content exceeds 65%, there is a tendency that Tg becomes too high and temperature dependency is increased. Herein the vinyl content of the SBR (an amount of 1,2-bond butadiene unit) is a value measured by an infrared absorption spectroscopy.

A content of the SBR in the rubber component is not less than 70% by mass, preferably not less than 80% by mass. When the content of the SBR is less than 70% by mass, there is a tendency that sufficient wet grip performance cannot be obtained. In the most preferable embodiment, the content of the SBR is 100% by mass.

The rubber component according to this embodiment can comprise rubber components other than straight-chain SBR (other rubber components). Examples of the other rubber components include diene rubbers other than SBR such as isoprene rubber including natural rubber (NR) and polyisoprene rubber (IR), SBR other than straight-chain SBR, butadiene rubber (BR), styrene-isoprene-butadiene rubber (SIBR), chloroprene rubber (CR) and acrylonitrile-butadiene rubber (NBR), and butyl rubbers. These rubber components may be used alone or may be used in combination of two or more thereof. It is preferable that the rubber component comprises SBR and BR from the viewpoint of a balance of fuel efficiency, abrasion resistance, durability and wet grip performance.

It is preferable that the rubber composition comprises carbon black from a point that a coloring effect and a reinforcing effect can be obtained. For example, there are carbon black produced by an oil furnace method and the like, and two or more kinds of carbon black having different colloidal properties may be used in combination. Examples thereof include those of GPF, HAF, ISAF, SAF grades, and the like.

A nitrogen adsorption specific surface area ($N_2SA$) of the carbon black is preferably not less than 100 $m^2/g$, more preferably not less than 105 $m^2/g$, further preferably not less than 110 $m^2/g$ from the viewpoint of grip performance. Further, from the viewpoint of abrasion resistance, the $N_2SA$ of the carbon black is preferably not more than 600 $m^2/g$, more preferably not more than 250 $m^2/g$, further preferably not more than 180 $m^2/g$. It is noted that the $N_2SA$ of the carbon black is a value determined in accordance with JIS K6217-2: 2001.

A DBP oil absorption of the carbon black is preferably not less than 50 ml/100 g, more preferably not less than 100 ml/100 g from the viewpoint of abrasion resistance. On the other hand, the DBP oil absorption of the carbon black is preferably not more than 250 ml/100 g, more preferably not more than 200 ml/100 g, further more than 135 ml/100 g from the viewpoint of grip performance. It is noted that the DBP oil absorption of the carbon black is a value measured in accordance with JIS K6217-4: 2008.

A content of the carbon black is not less than 5 parts by mass, preferably not less than 10 parts by mass based on 100 parts by mass of the rubber component. When the content is less than 5 parts by mass, sufficient abrasion resistance and grip performance may not be obtained. Further the content of the carbon black is not more than 30 parts by mass, preferably not more than 20 parts by mass. When the content exceeds 30 parts by mass, grip performance may decrease.

Silica generally used may be used as the silica, and examples thereof include silica prepared by a dry method (anhydrous silica), silica prepared by a wet method (hydrous silica) and the like. For the reason that the number of silanol groups is large, silica prepared by a wet method is preferable.

A nitrogen adsorption specific surface area ($N_2SA$) of the silica is preferably not less than 40 $m^2/g$, more preferably not less than 50 $m^2/g$, further preferably not less than 100 $m^2/g$, further preferably not less than 130 $m^2/g$, particularly preferably not less than 160 $m^2/g$ from the viewpoint of breaking strength after vulcanization. Further, from the viewpoint of low heat build-up property and rubber processability, the $N_2SA$ of the silica is preferably not more than 500 $m^2/g$, more preferably not more than 300 $m^2/g$, further preferably not more than 250 $m^2/g$, most preferably not more than 200 $m^2/g$. It is noted that the nitrogen adsorption specific surface area of the silica is a value measured by a BET method in accordance with ASTM D3037-81.

A content of the silica is not less than 95 parts by mass, preferably not less than 100 parts by mass based on 100 parts by mass of the rubber component. Further, the content of the silica is preferably not more than 200 parts by mass, more preferably not more than 150 parts by mass from the viewpoint of improving its dispersibility at the time of kneading and from the viewpoint of inhibiting deterioration of processability due to re-agglomeration of the silica during heating at rolling and storage after rolling.

When the rubber composition comprises the silica, it is preferable that the silica is used in combination with a silane coupling agent. Any silane coupling agent which has been used in combination with silica in the rubber industry can be used as the silane coupling agent, and examples thereof include sulfide silane coupling agents such as Si75, Si266 (bis(3-triethoxysilylpropyl)disulfide) manufactured by Evonik Degussa and Si69 (bis(3-triethoxysilylpropyl)tetrasulfide) manufactured by Evonik Degussa; mercapto silane coupling agents (mercapto group-containing silane coupling agents) such as 3-mercaptopropyltrimethoxysilane, and NXT-Z100, NXT-Z45 and NXT manufactured by Momentive Performance Materials; vinyl silane coupling agents such as vinyltriethoxysilane; amino silane coupling agents such as 3-aminopropyltriethoxysilane; glycidoxy silane coupling agents such as γ-glycidoxypropyltriethoxysilane; nitro silane coupling agents such as 3-nitropropyltrimethoxysilane; and chloro silane coupling agents such as 3-chloropropyltrimethoxysilane, and the like. These silane coupling agents may be used alone or may be used in combination with two or more thereof. Among them, sulfide silane coupling agents and mercapto silane coupling agents are preferable from the viewpoint of their strong binding force with silica and excellent low heat build-up property.

When the rubber composition comprises the silane coupling agent, the content of the silane coupling agent is preferably not less than 2 parts by mass, more preferably not less than 3 parts by mass based on 100 parts by mass of the silica. When the content of the silane coupling agent is less than 2 parts by mass, there is a tendency that an effect of improving dispersion of the silica is not obtained sufficiently. On the other hand, the content of the silane coupling agent is preferably not more than 25 parts by mass, more preferably not more than 20 parts by mass. When the content of the silane coupling agent exceeds 25 parts by mass, an effect commensurate with cost tends not to be obtained.

The powder of the inorganic compound is represented by the following formula (A) and has an average primary particle size of 10 μm or less. When the rubber composition comprises this powder of the inorganic compound, an excellent wet grip performance can be obtained.

$$M \cdot \alpha SiO_2 \cdot \beta H_2O \quad (A)$$

(In the formula, M is an oxide or hydroxide of at least one metal selected from Al, Mg, Ti and Ca, and each of α and β is an integer of from 0 to 10.)

Examples of the powder of the inorganic compound represented by the formula (A) include aluminum oxide (alumina), alumina hydrate, aluminum hydroxide, magnesium hydroxide, magnesium oxide, talc, titanium white, titanium black, calcium oxide, calcium hydroxide, magnesium aluminum oxide, clay, pyrophyllite, bentonite, aluminum silicate, magnesium silicate, calcium silicate, silicate of aluminum and calcium, silicate of calcium and magnesium and the like. These inorganic compounds may be used alone or may be used in combination with two or more kinds thereof. In particular, for the reason that an effect of the present disclosure can be obtained more suitably, preferable is a hydroxide of a metal, in which M in the above-mentioned formula (A) is at least one metal selected from a group consisting of Al, Mg, Ti and Ca, and more preferable is an oxide or a hydroxide, in which M is Al. Aluminum hydroxide used in the present disclosure includes an aluminum hydrate.

An average primary particle size of the powder of the inorganic compound is 10 μm or less, preferably from 0.05 to 5 μm, more preferably from 0.1 to 3 μm. When the average primary particle size of the inorganic compound is 10 μm or less, satisfactory breaking resistance and more satisfactory abrasion resistance tend to be obtained. Herein it is noted that the average primary particle size of the inorganic compound is a number average particle size and is measured with a transmission electron microscope.

A content of the powder of the inorganic compound represented by the formula (A) is not less than 25 parts by mass, preferably not less than 30 parts by mass, more preferably not less than 35 parts by mass based on 100 parts by mass of the rubber component. When the content of the powder of the inorganic compound is less than 25 parts by mass, a sufficient wet grip performance may not be obtained. The content of the powder of the inorganic compound is preferably not more than 50 parts by mass, more preferably not more than 45 parts by mass, further preferably not more than 40 parts by mass, particularly preferably not more than 30 parts by mass based on 100 parts by mass of the rubber component. When the content of the powder of the inorganic compound is not more than 50 parts by mass, excellent abrasion resistance tends to be obtained, and when the content of the powder of the inorganic compound is not more than 30 parts by mass, more excellent abrasion resistance tends to be obtained.

The above-mentioned softening agent includes a coumarone-based resin. By combination use of the powder of the inorganic compound and the coumarone-based resin, deterioration of abrasion resistance by the powder of the inorganic compound can be lessened. Herein the coumarone-based resin is a copolymer of coumarone, indene and styrene. Examples of such coumarone-based resin include Nitto Resin Coumarone (manufactured by NITTO CHEMICAL CO., LTD.), Esukuron (manufactured by Nippon Steel & Sumikin Chemical Co., Ltd.), Neo Polymer (manufactured by Nippon Petrochemicals Co., Ltd.) and NOVARES C100 (manufactured by Rutgers Chemicals).

A softening point of the coumarone-based resin is preferably 60° C. or higher, more preferably 70° C. or higher from the viewpoint of wet grip performance. On the other hand, the softening point of the coumarone-based resin is preferably 170° C. or lower, more preferably 150° C. or lower from the viewpoint of wet grip performance. It is noted that in the present disclosure, the softening point of the coumarone-based resin is one specified in JIS K6220-1: 2001 and is a temperature at the time when the ball has dropped in the measurement with the ring and ball softening point measuring device.

A content of the coumarone-based resin is not less than 2 parts by mass, preferably not less than 3 parts by mass based on 100 parts by mass of the rubber component. When the content of the coumarone-based resin is less than 2 parts by mass, a sufficient wet grip performance may not be obtained. The content of the coumarone-based resin is not more than 15 parts by mass, preferably not more than 12 parts by mass. When the content of the coumarone-based resin exceeds 15 parts by mass, abrasion resistance may decrease.

It is preferable that the above-mentioned softening agent further comprises bis(2-ethylhexyl)sebacate. It can be considered that bis(2-ethylhexyl)sebacate is highly compatible with the SBR and the coumarone resin and exhibits a high plasticating effect, and therefore, uniformity of the rubber composition is improved and abrasion resistance can be further enhanced.

When the softening agent comprises bis(2-ethylhexyl) sebacate, a content thereof is preferably not less than 11 parts by mass, more preferably not less than 15 parts by mass based on 100 parts by mass of the rubber component from the viewpoint of wet grip performance. On the other hand, the content is preferably not more than 20 parts by mass from the viewpoint of abrasion resistance.

The softening agent can comprise a softening agent other than the above-mentioned coumarone-based resin and bis (2-ethylhexyl)sebacate (other softening agent). Examples of the other softening agent include oil, liquid diene polymers and the like. Example of oil includes process oil such as paraffinic, aromatic or naphthenic process oil. Herein, the content of the softening agent includes an amount of oil contained in an oil-extended rubber.

The above-mentioned liquid diene polymers are diene polymers in a liquid form at normal temperature (25° C.). In the liquid diene polymers, a weight-average molecular weight (Mw) thereof calibrated with polystyrene measured by gel permeation chromatography (GPC) is preferably from $1.0 \times 10^3$ to $2.0 \times 10^5$, more preferably from $3.0 \times 10^3$ to $1.5 \times 10^4$ from the viewpoint of durability and productivity. Herein, it is noted that the Mw of the liquid diene polymer is a value calibrated with polystyrene measured by gel permeation chromatography (GPC). Examples of the liquid diene polymers include a liquid styrene-butadiene copolymer (liquid SBR), a liquid butadiene polymer (liquid BR), a liquid isoprene polymer (liquid IR), a liquid styrene-isoprene copolymer (liquid SIR) and the like. Among these, the liquid SBR is preferable for the reason that abrasion resistance and stable grip performance during running can be obtained in good balance.

A total content of the softening agents is not less than 70 parts by mass, preferably not less than 75 parts by mass based on 100 parts by mass of the rubber component. When the content is less than 70 parts by mass, a sufficient wet grip performance may not be obtained. On the other hand, the total content of the softening agents is preferably not more than 150 parts by mass, more preferably not more than 140 parts by mass from the viewpoint of abrasion resistance and wet grip performance.

In addition to the above-mentioned components, to the rubber composition for a tread of the present embodiment can be properly added other components generally used in the preparation of a rubber composition, for example, stearic acid, zinc oxide, various antioxidants, a wax, a vulcanizing agent, a vulcanization accelerator and the like.

The zinc oxide is not limited particularly, and there are exemplified, for example, those used in the field of a rubber for a tire and the like. Here, among zinc oxides, fine particle zinc oxides can be used suitably. Specifically it is preferable to use zinc oxide having an average primary particle size of not more than 200 nm, more preferably not more than 100 nm. A lower limit of the average primary particle size is not limited particularly, and is preferably not less than 20 nm, more preferably not less than 30 nm. It is noted that the average primary particle size of the zinc oxide stands for an average particle size (average primary particle size) calibrated with a specific surface area measured by a BET method by nitrogen adsorption.

When the rubber composition comprises the zinc oxide, a content of the zinc oxide is preferably from 0.5 to 10 parts by mass, more preferably from 1 to 5 parts by mass based on 100 parts by mass of the rubber component. When the content of the zinc oxide is within the above-mentioned range, an effect of the present disclosure can be obtained more suitably.

The antioxidant is not limited particularly, and those used in the field of a rubber can be used. Examples thereof include quinoline antioxidants, quinone antioxidants, phenol antioxidants and phenylenediamine antioxidants, and the like.

When the rubber composition comprises the antioxidant, a content of the antioxidant is preferably not less than 0.5 part by mass, more preferably not less than 0.8 part by mass based on 100 parts by mass of the rubber component. On the other hand, the content of the antioxidant is preferably not more than 2.0 parts by mass, more preferably not more than 1.5 parts by mass, further preferably not more than 1.2 parts by mass from the viewpoint of dispersion of a filler and the like, elongation at break and a kneading efficiency.

Sulfur and a sulfur-containing compound such as caprolactam disulfide are used as the vulcanizing agent. Examples of sulfur as the vulcanizing agent include powder sulfur, precipitated sulfur, colloidal sulfur, insoluble sulfur and oil-treated sulfur, and the like. These can be used alone or in a mixture of two or more kinds thereof.

When the rubber composition comprises the vulcanizing agent, a content thereof is preferably not less than 0.5 part by mass, more preferably not less than 0.6 part by mass based on 100 parts by mass of the rubber component from the viewpoint of a satisfactory vulcanization reaction. On the other hand, the content of vulcanizing agent is preferably not more than 3 parts by mass, more preferably not more than 2 parts by mass from the viewpoint of grip performance and abrasion resistance.

Examples of the vulcanization accelerator include guanidine compounds, aldehyde-amine compounds, aldehyde-ammonia compounds, thiazole compounds, sulfenamide compounds, thiourea compounds, thiuram compounds, dithiocarbamate compounds xanthate compounds, and the like. Among these, vulcanization accelerators comprising a thiazole compound or a thiuram compound are preferable from the viewpoint of suitably obtaining an effect of the present disclosure.

Examples of the thiazole vulcanization accelerator include 2-mercaptobenzothiazole, cyclohexylamine salt of 2-mercaptobenzothia, di-2-benzothiazolyl disulfide and the like. Among these, di-2-benzothiazolyl disulfide is preferable. Examples of the thiuram vulcanization accelerator include tetramethylthiuram disulfide (TMTD), tetrabenzylthiuram disulfide (TBzTD), tetrakis(2-ethylhexyl)thiuram disulfide (TOT-N) and the like.

When the rubber composition comprises the vulcanization accelerator, a content thereof is preferably not less than 0.5 part by mass, more preferably not less than 1.0 part by mass based on 100 parts by mass of the rubber component from the viewpoint of ensuring a sufficient vulcanization rate. On the other hand, the content of the vulcanization accelerator is preferably not more than 10 parts by mass, more preferably not more than 5 parts by mass from the viewpoint of inhibiting blooming.

The rubber composition for a tread of the present embodiment can be prepared by a usual method. The rubber composition can be prepared, for example, by kneading the above-mentioned components except the vulcanizing agent and the vulcanization accelerator with a known kneading apparatus usually used in the rubber industry such as a Banbury mixer, a kneader or an open roll and then adding the vulcanizing agent and the vulcanization accelerator followed by further kneading of the mixture and then carrying out vulcanization.

The tire having a tread composed of the rubber composition for a tread according to another embodiment can be produced by a usual method. Namely, the tire can be produced by subjecting the rubber composition prepared by compounding the above-mentioned additives with the rubber component according to necessity, to extrusion processing to a shape of a tread, and then laminating together with other tire members on a tire building machine and forming by a usual forming method, thus forming an unvulcanized tire, and heating and compressing this unvulcanized tire in a vulcanizer.

Further, an embodiment of the present disclosure is as follows.

[1] A rubber composition for a tread comprising:
5 to 30 parts by mass, preferably 10 to 20 parts by mass of a carbon black,
95 parts by mass or more, preferably 95 to 200 parts by mass, more preferably 100 to 150 parts by mass of silica,
25 parts by mass or more, preferably 25 to 50 parts by mass, more preferably 30 to 45 parts by mass, further preferably 35 to 40 parts by mass of a powder of an inorganic compound represented by the following formula (A) and having an average primary particle size of 10 μm or less, preferably 0.05 to 10 μm, more preferably 0.05 to 5 μm, further preferably 0.1 to 3 μm, and
70 parts by mass or more, preferably 70 to 150 parts by mass, more preferably 75 to 140 parts by mass of a softening agent comprising 2 to 15 parts by mass, preferably 3 to 12 parts by mass of a coumarone-based resin,
based on 100 parts by mass of a rubber component comprising 70% by mass or more, preferably 80% by mass or more, the most preferably 100% by mass of a styrene-butadiene rubber having a styrene content of from 20 to 50% by mass, preferably 25 to 47% by mass and a vinyl content of from 15 to 65%, preferably 20 to 63%, $$M \cdot \alpha SiO_2 \cdot \beta H_2O \qquad (A)$$

(In the formula, M is an oxide or hydroxide of at least one metal selected from Al, Mg, Ti and Ca, and each of α and β is an integer of from 0 to 10.)

[2] The rubber composition for a tread of [1] above, wherein the softening agent comprises 11 to 20 parts by mass, preferably 15 to 20 parts by mass of bis(2-ethylhexyl) sebacate.

[3] The rubber composition for a tread of [1] or [2] above, wherein the powder of an inorganic compound is made of aluminum oxide and/or aluminum hydroxide.

[4] A tire having a tread composed of the rubber composition for a tread of any one of [1] to [3] above.

EXAMPLE

The present disclosure will be described based on Examples, but the present disclosure is not limited thereto only.

A variety of chemicals used in Examples and Comparative Examples will be explained below.
SBR: Tufdene 4850 (un-modified S-SBR, styrene content: 40% by mass, vinyl content: 46%, including 50 parts by mass of oil based on 100 parts by mass of a solid rubber) manufactured by Asahi Kasei Corporation
BR: BR150B (high-cis BR, cis content: 97% by mass, trans content: 2% by mass, vinyl content 1% by mass) manufactured by Ube Industries, Ltd.
Carbon black: SEAST 9SAF ($N_2SA$: 142 $m^2/g$, DBP oil absorption: 115 ml/100 g) manufactured by Tokai Carbon Co., Ltd.
Silica: Ultrasil VN3 ($N_2SA$: 175 $m^2/g$) manufactured by Evonik Degussa Aluminum hydroxide: Higilite H-43 (average primary particle size: 0.78 μm) manufactured by SHOWA DENKO K.K.
Aluminum oxide: A-26 (average primary particle size: 1 μm) manufactured by Sumitomo Chemical Company, Limited.
Silane coupling agent: Si69 (bis(3-triethoxysilylpropyl)tetrasulfide) manufactured by Evonik Degussa
Coumarone-based resin: NOVARES C100 (coumarone-indene resin, softening point: 100° C.) manufactured by Rutgers Chemicals
DOS: Bis(2-ethylhexyl)sebacate manufactured by DAIHACHI CHEMICAL INDUSTRY CO., LTD.
Oil: Vivatec 500 (TDAE oil, Tg: −58° C.) manufactured by H&R
Zinc oxide: Zinc Oxide No. 2 manufactured by Mitsui Mining & Smelting Co., Ltd.
Stearic acid: Stearic acid "Tsubaki" manufactured by NOF Corporation
Antioxidant: ANTIGEN 6C
(N-(1,3-dimethylbutyl)-N'-phenyl-p-phenylenediamine) manufactured by Sumitomo Chemical Company Limited
Sulfur: Powdered sulfur manufactured by Karuizawa Iou Kabushiki Kaisha
Vulcanization accelerator 1: PERKACIT DPG (1,3-diphenylguanidine) manufactured by FLEXSYS
Vulcanization accelerator 2: Nocceler TOT-N (tetrakis(2-ethylhexyl)thiuram disulfide) manufactured by OUCHI SHINKO CHEMICAL INDUSTRIAL CO., LTD.

EXAMPLES AND COMPARATIVE EXAMPLES

According to compounding formulations shown in Tables 1 and 2, chemicals other than a vulcanizing agent and a vulcanization accelerator were kneaded with a 1.7 L enclosed Banbury mixer for 5 minutes until a discharge temperature of 170° C. was reached, to obtain a kneaded product. Further the obtained kneaded product was kneaded again (re-milling) with the Banbury mixer at a discharge temperature of 150° C. for 4 minutes. Then, to the obtained kneaded product were added sulfur and the vulcanization accelerator, and the mixture was kneaded for 4 minutes until the temperature reached 105° C. by using a biaxial open roll, to obtain an unvulcanized rubber composition. The obtained unvulcanized rubber composition was extrusion-molded, using an extruder with an extrusion nozzle having a specific shape, into a form of a tread, and an extrudate was laminated with other tire members to form an unvulcanized tire, followed by press-vulcanization to produce a test tire (tire size: 195/65R15). The following evaluations were made using the obtained test tires. The results of the evaluations are shown in Tables 1 and 2.

Wet Grip Performance

The tires for test were mounted on all wheels of a 2000 cc domestic FR car, and the car was run 10 rounds of a test course (3 km per 1 round) of a wet asphalt road. A test driver evaluated controllability at the best lap time which is shown as an index, assuming the index of Reference Comparative Example to be 100. The larger the index is, the better the grip performance on a wet road is.

Abrasion Resistance

The tires for test were mounted on all wheels of a 2000 cc domestic FR car, and the car was run 10 rounds of a test course (3 km per 1 round) of a dry asphalt road. Of these tires and tires after evaluation of the above wet grip performance, namely of eight tires, each remaining groove (15 mm in a new tire) was measured and an average value was calculated. Evaluation is shown as an index, assuming the index of Reference Comparative Example to be 100. The larger the index is, the better the abrasion resistance is.

TABLE 1

| Compounding amount | Comparative Examples | | | | | | | | Examples | | | |
|---|---|---|---|---|---|---|---|---|---|---|---|---|
| (part by mass) | 1 | 2 | 3 | 4 | 5 | 6 | 7 | 8 | 1 | 2 | 3 | 4 |
| SBR | 150 | 150 | 150 | 150 | 150 | 150 | 75 | 150 | 150 | 150 | 150 | 150 |
| BR | — | — | — | — | — | — | 50 | — | — | — | — | — |
| Carbon black | 15 | 15 | 15 | 15 | 15 | 15 | 15 | 50 | 15 | 20 | 15 | 20 |
| Silica | 90 | 90 | 120 | 120 | 90 | 120 | 120 | 60 | 120 | 130 | 120 | 130 |
| Aluminum hydroxide | 40 | 40 | 20 | 40 | 40 | — | 40 | 40 | 40 | 35 | 40 | 35 |
| Aluminum oxide | — | — | — | — | — | — | — | — | — | — | — | — |
| Silane coupling agent | 9 | 9 | 12 | 12 | 9 | 12 | 12 | 6 | 12 | 13 | 12 | 13 |
| Coumarone-based resin | 5 | 5 | 5 | — | 40 | 5 | 5 | 5 | 5 | 5 | 10 | 10 |
| DOS | 15 | — | 15 | 15 | 15 | 15 | 15 | 15 | 15 | 15 | 15 | 15 |
| Oil | 55 | 70 | 55 | 55 | 55 | 55 | 55 | 55 | 55 | 65 | 55 | 65 |
| Zinc oxide | 4 | 4 | 4 | 4 | 4 | 4 | 4 | 4 | 4 | 4 | 4 | 4 |
| Stearic acid | 1 | 1 | 1 | 1 | 1 | 1 | 1 | 1 | 1 | 1 | 1 | 1 |
| Antioxidant | 2 | 2 | 2 | 2 | 2 | 2 | 2 | 2 | 2 | 2 | 2 | 2 |
| Sulfur | 1.2 | 1.2 | 1.2 | 1.2 | 1.2 | 1.2 | 1.2 | 1.2 | 1.2 | 1.2 | 1.2 | 1.2 |

TABLE 1-continued

| Compounding amount | Comparative Examples | | | | | | | | Examples | | | |
|---|---|---|---|---|---|---|---|---|---|---|---|---|
| (part by mass) | 1 | 2 | 3 | 4 | 5 | 6 | 7 | 8 | 1 | 2 | 3 | 4 |
| Vulcanization accelerator 1 | 4 | 4 | 4 | 4 | 4 | 4 | 4 | 4 | 4 | 4 | 4 | 4 |
| Vulcanization accelerator 2 | 2 | 2 | 2 | 2 | 2 | 2 | 2 | 2 | 2 | 2 | 2 | 2 |
| Evaluation | | | | | | | | | | | | |
| Wet grip performance | 100 | 105 | 105 | 101 | 115 | 92 | 71 | 86 | 131 | 143 | 135 | 149 |
| Abrasion resistance | 100 | 92 | 106 | 107 | 89 | 102 | 102 | 121 | 105 | 102 | 104 | 101 |

TABLE 2

| Compounding amount | Comparative Examples | | | | | | | | Examples | | | |
|---|---|---|---|---|---|---|---|---|---|---|---|---|
| (part by mass) | 9 | 10 | 11 | 12 | 13 | 14 | 15 | 16 | 5 | 6 | 7 | 8 |
| SBR | 150 | 150 | 150 | 150 | 150 | 150 | 75 | 150 | 150 | 150 | 150 | 150 |
| BR | — | — | — | — | — | — | 50 | — | — | — | — | — |
| Carbon black | 15 | 15 | 15 | 15 | 15 | 15 | 15 | 50 | 15 | 20 | 15 | 20 |
| Silica | 90 | 90 | 120 | 120 | 90 | 120 | 120 | 60 | 120 | 130 | 120 | 130 |
| Aluminum hydroxide | — | — | — | — | — | — | — | — | — | — | — | — |
| Aluminum oxide | 40 | 40 | 20 | 40 | 40 | — | 40 | 40 | 40 | 35 | 40 | 35 |
| Silane coupling agent | 9 | 9 | 12 | 12 | 9 | 12 | 12 | 6 | 12 | 13 | 12 | 13 |
| Coumarone-based resin | 5 | 5 | 5 | — | 40 | 5 | 5 | 5 | 5 | 5 | 10 | 10 |
| DOS | 15 | — | 15 | 15 | 15 | 15 | 15 | 15 | 15 | 15 | 15 | 15 |
| Oil | 55 | 70 | 55 | 55 | 55 | 55 | 55 | 55 | 55 | 65 | 55 | 65 |
| Zinc oxide | 4 | 4 | 4 | 4 | 4 | 4 | 4 | 4 | 4 | 4 | 4 | 4 |
| Stearic acid | 1 | 1 | 1 | 1 | 1 | 1 | 1 | 1 | 1 | 1 | 1 | 1 |
| Antioxidant | 2 | 2 | 2 | 2 | 2 | 2 | 2 | 2 | 2 | 2 | 2 | 2 |
| Sulfur | 1.2 | 1.2 | 1.2 | 1.2 | 1.2 | 1.2 | 1.2 | 1.2 | 1.2 | 1.2 | 1.2 | 1.2 |
| Vulcanization accelerator 1 | 4 | 4 | 4 | 4 | 4 | 4 | 4 | 4 | 4 | 4 | 4 | 4 |
| Vulcanization accelerator 2 | 2 | 2 | 2 | 2 | 2 | 2 | 2 | 2 | 2 | 2 | 2 | 2 |
| Evaluation | | | | | | | | | | | | |
| Wet grip performance | 100 | 105 | 105 | 101 | 115 | 92 | 71 | 86 | 131 | 143 | 135 | 149 |
| Abrasion resistance | 100 | 92 | 106 | 107 | 89 | 102 | 102 | 121 | 105 | 102 | 104 | 101 |

From the results of Tables 1 and 2, it is seen that the rubber composition of the present disclosure and the tire of the present disclosure having the tread composed of the rubber composition are excellent in abrasion resistance and wet grip performance.

What is claimed is:

1. A rubber composition for a tread comprising:
   5 to 20 parts by mass of a carbon black,
   95 parts by mass or more of silica,
   wherein a nitrogen adsorption specific surface area of the silica is 40 to 500 m²/g,
   35 parts by mass to 50 parts by mass of a powder of an inorganic compound represented by the following formula (A) and having an average primary particle size of 10 μm or less, and
   70 parts by mass or more of a softening agent comprising 2 to 15 parts by mass of a coumarone-based resin,
   based on 100 parts by mass of a rubber component comprising 70% by mass or more of a styrene-butadiene rubber having a styrene content of from 20 to 50% by mass and a vinyl content of from 15 to 65%, $$M \cdot \alpha SiO_2 \cdot \beta H_2O \quad (A)$$

wherein in formula (A), M is an oxide or hydroxide of at least one metal selected from Al, Mg, Ti and Ca, and each of α and β is an integer of from 0 to 10, and
   wherein the coumarone-based resin is an only resin of the rubber composition.

2. A rubber composition for a tread comprising:
   5 to 30 parts by mass of a carbon black,
   not less than 120 parts by mass or more of silica,
   wherein a nitrogen adsorption specific surface area of the silica is 40 to 500 m²/g,
   25 parts by mass or more of a powder of an inorganic compound represented by the following formula (A) and having an average primary particle size of 10 μm or less, and
   70 parts by mass or more of a softening agent comprising 2 to 15 parts by mass of a coumarone-based resin,
   based on 100 parts by mass of a rubber component comprising 70% by mass or more of a styrene-butadiene rubber having a styrene content of from 20 to 50% by mass and a vinyl content of from 15 to 65%, $$M \cdot \alpha SiO_2 \cdot \beta H_2O \quad (A)$$

wherein in formula (A), M is an oxide or hydroxide of at least one metal selected from Al, Mg, Ti and Ca, and each of α and β is an integer of from 0 to 10, and
   wherein the coumarone-based resin is an only resin of the rubber composition.

3. The rubber composition for a tread of claim 1, wherein the softening agent comprises 11 to 20 parts by mass of bis(2-ethylhexyl)sebacate.

4. The rubber composition for a tread of claim 1, wherein the powder of an inorganic compound is made of aluminum oxide and/or aluminum hydroxide.

5. A tire having a tread composed of the rubber composition for a tread of claim 1.

6. A rubber composition for a tread comprising:
   5 to 20 parts by mass of a carbon black,
   120 to 200 parts by mass of silica, 35 to 50 parts by mass of a powder of an inorganic compound represented by the following formula (A) and having an average primary particle size of 10 μm or less, and 70 parts by mass or more of a softening agent comprising 2 to 15 parts by mass of a coumarone-based resin, based on 100 parts by mass of a rubber component comprising 70% by mass or more of a styrene-butadiene rubber having a styrene content of from 20 to 50% by mass and a vinyl content of from 15 to 65%, $$M \cdot \alpha SiO_2 \cdot \beta H_2O \quad (A)$$

wherein in formula (A), M is an oxide or hydroxide of at least one metal selected from Al, Mg, Ti and Ca, and each of $\alpha$ and $\beta$ is an integer of from 0 to 10.

7. The rubber composition for a tread of claim 6, wherein the softening agent comprises 11 to 20 parts by mass of bis(2-ethylhexyl)sebacate.

8. The rubber composition for a tread of claim 6, wherein the powder of an inorganic compound is made of aluminum oxide and/or aluminum hydroxide.

9. A tire having a tread composed of the rubber composition for a tread of claim 6.

10. The rubber composition for a tread of claim 6, wherein a softening point of the coumarone-based resin is 60° C. or higher.

11. The rubber composition for a tread of claim 6, wherein a nitrogen adsorption specific surface area of the silica is 40 to 500 $m^2/g$.

12. The rubber composition for a tread of claim 6, wherein the rubber composition further comprises 1,3-diphenyl-guanidine and tetrakis(2-ethylhexyl)thiuram disulfide as vulcanization accelerators.

13. The rubber composition for a tread of claim 8, wherein the softening agent further comprises 11 to 20 parts by mass of bis(2-ethylhexyl)sebacate.

* * * * *